Oct. 19, 1943.　　　L. S. HARBER　　　2,332,315
MANUFACTURE OF BREAD
Filed Feb. 26, 1942　　　2 Sheets-Sheet 1
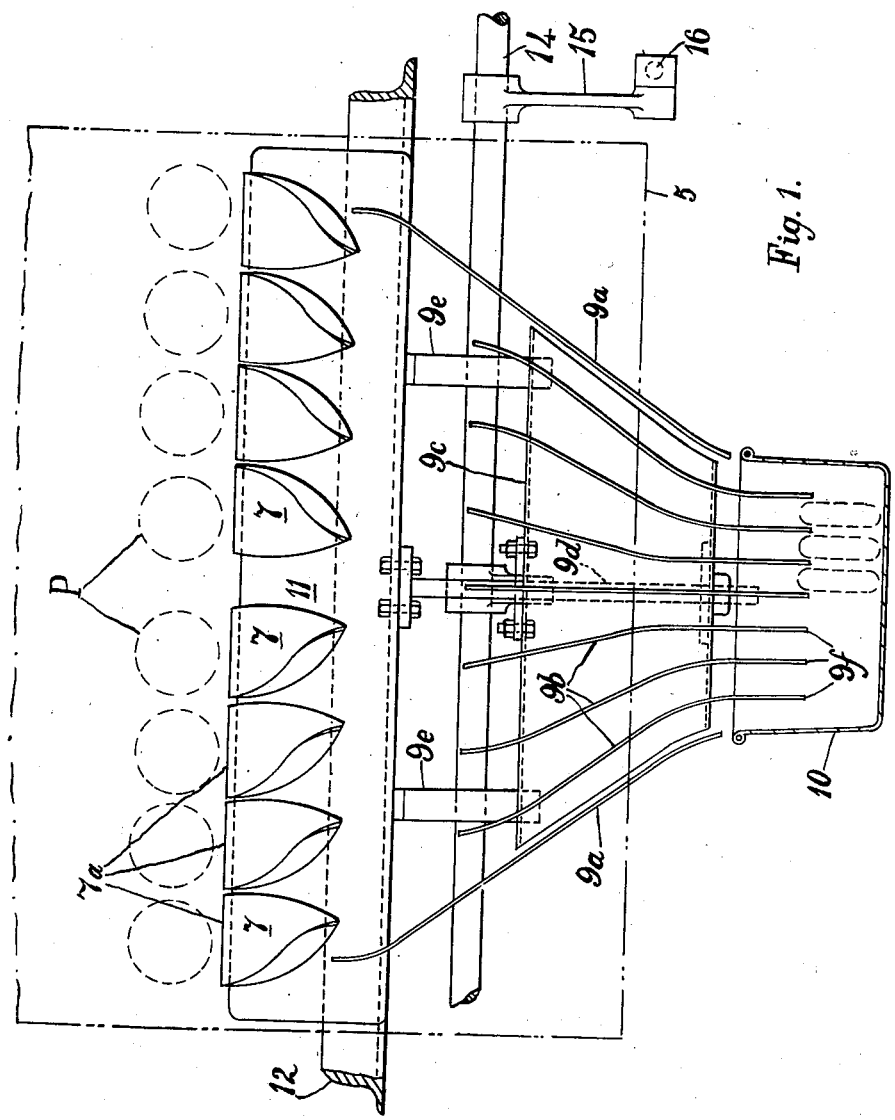
Inventor
L. S. Harber
By Glascock Downing & Seebold
Attys

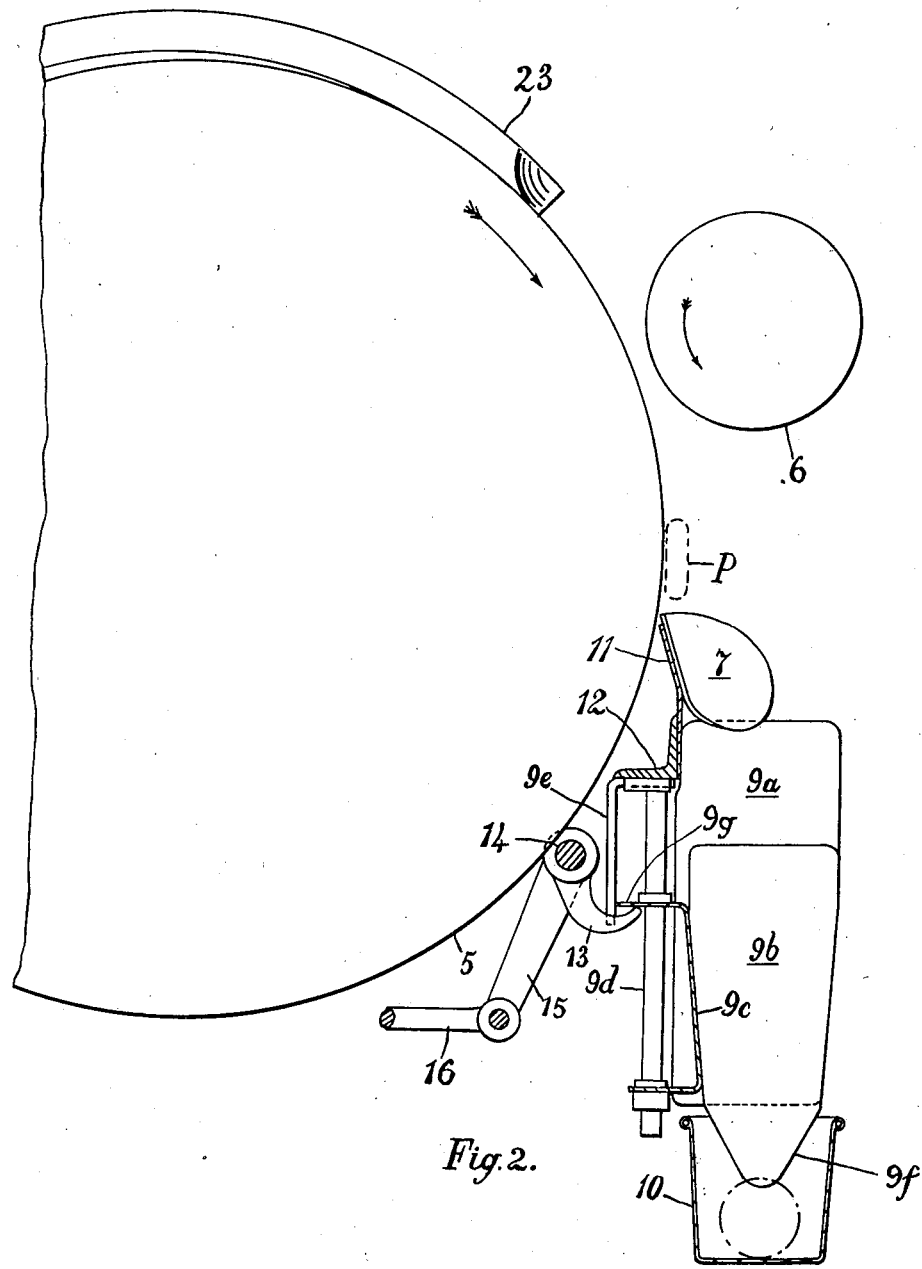

UNITED STATES PATENT OFFICE 2,332,315

MANUFACTURE OF BREAD

Laurence Seymour Harber, Peterborough, England, assignor to Baker Perkins Limited, Peterborough, England Application February 26, 1942, Serial No. 432,509
In Great Britain May 8, 1940

4 Claims. (Cl. 107—7)

This invention relates to the manufacture of tin bread having a laminated structure and more particularly laminated bread according to prior patent specification No. 2,045,228, and is a continuation in part of serial application No. 407,660, filed August 20, 1941. In patent specification Serial No. 726,102, filed May 17, 1934, and issued July 16, 1935, as Patent No. 2,008,036, there is described a plant for the mechanical manufacture of laminated bread as aforesaid in which a group of flattened dough pieces are fed in succession along a common path into the baking tin.

As compared with the plant described in the last-mentioned specification, an aim of the present invention is to provide means adapted to afford an increased output and more uniform product.

According to the invention, in the production of laminated bread a group of flattened dough pieces or plaques are fed in parallel (i. e., along individual paths) to a baking tin so that they form a laminated body on edge in the baking tin with laminae substantially at right-angles to the axis of the tin, the plaques being guided in their paths to the tin by chute means formed by partitions which are displaceable whereby they extend into the tin during the feeding of the plaque therein.

In the accompanying diagrammatic drawings:

Figure 1 is a front view of a guiding chute according to the invention,

Figure 2 is a side view showing the arrangement of the chute with dough piece flattening means.

In carrying the invention into effect, as described by way of example, with reference to a dough piece flattening and feeding means as disclosed in my application Serial No. 407,660, to which reference may be had for further particulars, a rotary drum 5 of substantial diameter is provided and mounted in suitable bearings in side frames. Adjacent the position where the surface of the drum begins to travel downwardly a flattening roller 6 is mounted with its axis parallel with that of the drum and adapted to co-operate with the drum surface to flatten dough pieces fed forward upon or above the surface of the drum.

Instead of employing a single roller 6 a pair of rollers or a plurality of rollers may be employed for flattening, in reference to which the dough pieces are subjected to a successive flattening operation in passing under each roller.

On the delivery side of the flattening roller 6 (or rollers) is a series of guide plates 7 which are adapted to turn the flattened dough pieces or plaques P received from the flattening roller through an angle of approximately 90°. Where it is intended that eight dough pieces should be used to compose a loaf, eight guides are provided. The outer guides may also be curved to direct the dough pieces inwardly towards the central transverse plane of the drum. The guides 7 are mounted on a plate 11 secured to an angle 12 suitably supported from the side frames of the machine, and each guide comprises a plate which is skewed so that a part or edge 7a engages under a flattened dough piece and detaches it from the drum surface and as the dough piece or plaque P falls by gravity the twist in the plate turns the dough piece round through approximately 90°. Below the guide plates is a series of nine partition walls 9a and 9b forming eight chutes in parallel, corresponding in number with the number of dough pieces in the groups to be received. These chute partition walls converge so that their lower extremities may lie approximately within the area of the opening of a baking tin 10 to bring the flattened dough pieces face to face and separated only by the thickness of the partitions. The outer partitions 9a are fixed and terminate above the opening of the tin 10. The inner partitions 9b are adapted to guide the dough pieces as they are fed into the tin. For this purpose the partitions 9b have a vertical reciprocatory movement so that their lower ends 9f move into the tin so as to maintain control of the dough pieces until they all are settled on edge side by side in position within the tin.

The partitions 9b are secured to a back plate 9c guided upon the rod 9d and guide bars 9e.

Reciprocation of the flared displaceable guides 9b is effected by an oscillating finger 13 which engages beneath the bent over portion 9g of the plate 9c. The finger 13 is secured to a rock shaft 14 which is rocked by the lever 15 and link 16 connected to any suitable means whereby the shaft 14 is rocked in synchronism with the feed of the dough pieces.

The tins 10 are supported upon a conveyor and their movement is controlled as set out in application No. 407,660.

The dough pieces may be fed in parallel to the flattening roll 6 according to the method set out in application No. 407,660, i. e., by means of the drum 5 and dividing and separating means 23.

I claim:

1. In apparatus for manufacturing laminated bread, means for feeding a group of flattened dough pieces in parallel along individual paths into chute means for delivery into a baking tin so that they form a laminated body on edge in the tin with laminae substantially at right angles to the longitudinal axis of the tin, said chute comprising a plurality of rigid partitions located in a substantially vertical plane and converging toward each other at their lower ends to form a plurality of converging paths, and means for displacing the partitions vertically whereby their lower ends extend into the tin, temporarily to divide the tin into a plurality of compartments during the feeding of the dough pieces therein.

2. In apparatus for manufacturing laminated bread, means for feeding a group of flattened dough pieces in parallel along individual paths into chute means for delivery into a baking tin so that they form a laminated body on edge in the tin with laminae substantially at right angles to the longitudinal axis of the tin, said chute comprising a plurality of rigid partitions located in a substantially vertical plane and converging toward each other at their lower ends to form a plurality of converging paths, the outer partitions being fixed, the intermediate partitions being displaceable vertically whereby their lower ends extend into the tin, temporarily to divide the tin into a plurality of compartments during the feeding of the dough pieces therein, and means for displacing said intermediate partitions.

3. In apparatus for manufacturing laminated bread, means for feeding a group of flattened dough pieces in parallel along individual paths into chute means for delivery into a baking tin so that they form a laminated body on edge in the tin with laminae substantially at right angles to the longitudinal axis of the tin, said chute comprising a plurality of rigid partitions located in a substantially vertical plane and converging toward each other at their lower ends to form a plurality of converging paths, the outer partitions being fixed, a mounting carrying the intermediate partitions, means for guiding said mounting for vertical displacement, a rock shaft, a finger carried by the rock shaft and underlying the mounting, and means for rocking said rock shaft whereby the intermediate partitions are verticaly reciprocated to cause their lower ends to be located in the baking tin, temporarily to divide the tin into a plurality of compartments, during the feeding of the dough pieces therein.

4. In apparatus for manufacturing laminated bread, means for feeding a group of flattened dough pieces in parallel along individual paths into chute means for delivery into a baking tin so that they form a laminated body on edge in the tin with laminae substantially at right angles to the longitudinal axis of the tin, said chute comprising a plurality of rigid partitions located in a substantially vertical plane and converging toward each other at their lower ends to form a plurality of converging paths, and means for causing relative vertical movement between the chute and a tin located below the chute to cause the lower ends of the partitions to be located in said tin, temporarily to divide the tin into a plurality of compartments during the feeding of the dough pieces therein.

LAURENCE SEYMOUR HARBER.